United States Patent [19]
Kim et al.

[11] Patent Number: 5,973,658
[45] Date of Patent: Oct. 26, 1999

[54] LIQUID CRYSTAL DISPLAY PANEL HAVING A STATIC ELECTRICITY PREVENTION CIRCUIT AND A METHOD OF OPERATING THE SAME

[75] Inventors: Seong-Gyun Kim, Seoul; Ju-Cheon Yeo, Kyungki-do, both of Rep. of Korea

[73] Assignee: LG Electronics, Inc., Seoul, Rep. of Korea

[21] Appl. No.: 08/873,927

[22] Filed: Jun. 12, 1997

[30] Foreign Application Priority Data

Dec. 10, 1996 [KR] Rep. of Korea ............... 96-63442

[51] Int. Cl.$^6$ ........................................... G09G 3/36
[52] U.S. Cl. ...................... 345/92; 345/98; 345/100; 345/904; 349/40
[58] Field of Search ........................ 345/87, 92, 98, 345/100, 904; 349/40

[56] References Cited

U.S. PATENT DOCUMENTS

| | | | |
|---|---|---|---|
| 5,068,748 | 11/1991 | Ukai et al. ........................ | 359/59 |
| 5,220,443 | 6/1993 | Noguchi ........................... | 359/59 |
| 5,373,377 | 12/1994 | Ogawa et al. .................... | 359/59 |
| 5,497,146 | 3/1996 | Hebiguchi ....................... | 340/825.91 |
| 5,576,730 | 11/1996 | Shimada et al. ................. | 345/98 |
| 5,657,139 | 8/1997 | Hayashi ........................... | 349/40 |
| 5,671,026 | 9/1997 | Shiraki et al. ................... | 349/40 |

FOREIGN PATENT DOCUMENTS 8-116573  7/1983  Japan .
3-220289  9/1988  Japan .

Primary Examiner—Dennis-Doon Chow
Assistant Examiner—Amr Awad

[57] ABSTRACT

A method and apparatus for controlling at least one transmission line in a liquid crystal display includes at least one transmission gate. The liquid crystal display includes a plurality of pixels, and each pixel includes a thin film transistor. At least one thin film transistor is connected to the transmission line. The transmission gate has first and second gates, an input and an output. The input is connected to the transmission line. The transmission gate transmits when one of a first voltage of said first gate is greater than a voltage of said input and a second voltage of said second gate is less than said voltage of said input. A first external terminal is connected to the first gate, a second external terminal is connected to the second gate, and a common external terminal is connected to the output of the transmission gate. When the first and second external terminals apply a floating potential, static electricity generated in the transmission line discharges through the transmission gate to the third external terminal. When a low and high voltage are respectively applied to the first and second external terminals, the transmission gate effectively isolates the transmission line. Alternatively, by applying a high and low voltage, respectively, to the first and second external terminals, the transmission line can be pre-charged via the transmission gate with a voltage applied to the common external terminal.

40 Claims, 6 Drawing Sheets

LIQUID CRYSTAL DISPLAY PANEL HAVING A STATIC ELECTRICITY PREVENTION CIRCUIT AND A METHOD OF OPERATING THE SAME

BACKGROUND OF THE INVENTION

1. Field of the Invention

The present invention relates to a liquid crystal panel for eliminating static electricity generated during the manufacture of the liquid crystal display, and a method of operating the same. More particularly, the present invention relates to a static electricity prevention type liquid crystal panel and a method of operating the same which allows testing of a driving circuit and a pixel section of a driving circuit integrated TFTLCD (thin film transistor liquid crystal display).

2. Description of Related Art

Generally, when manufacturing an LCD panel, static electricity is generated from the upper and lower glass panels of a liquid crystal display panel. If the generated static electricity is maintained, it makes accurately manufacturing the liquid crystal display difficult.

Techniques are suggested in Japanese laid-open patent publications 58-116573 and 63-220289 for eliminating static electricity generated in the liquid crystal panel during the manufacturing process. Since these techniques are described in detailed in the above mentioned publications, the following description of these techniques is provided to discuss problems arising from manufacturing and operating a liquid crystal display device using the above described techniques.

FIG. 1 shows a perspective view of conductive lines of a conventional liquid crystal display for illustrating the conventional method of preventing static electricity as described in Japanese laid-open patent publication 58-116573.

As shown in FIG. 1, a plurality of signal lines G and a plurality of data lines D cross each other to form a cell array. The signal lines are also known as gate lines G. A short conductor ST commonly connects the gate lines G and data lines D so as to maintain the voltage levels thereon at an equal electric potential and eliminate static electricity.

Later in the manufacturing process, the gate lines G and the data lines D are severed according to the dotted line CL. The cut portions of the gate and the data lines G and D are connected to separately manufactured gate driving and data driving circuits (not shown), respectively, to form the liquid crystal panel.

Recently, in order to form a high resolution liquid crystal display panel, a driving circuit and a cell array have been integrated to simplify the manufacturing process and to enhance the reliability of the liquid crystal display device. However, the above described technique for preventing static electricity is not applicable to such an integrated liquid crystal panel for the following reasons.

As shown in FIG. 1, since all of the conductive lines are connected by the short conductor ST, testing of different driving circuits cannot be performed during the manufacturing process.

FIG. 2 shows another technique for preventing static electricity as described in Japanese laid-open patent publication 63-220289.

As shown in FIG. 2, a reference potential line SL is provided external to the region where the gate and data lines G and D are positioned. The reference potential line SL has a certain electric potential value. The source terminals of NMOS transistors 2 are connected to the reference potential line SL, while the gate and drain terminals of the NMOS transistor 2 are connected to an associated data line D. The source terminals of NMOS transistors 4 are connected to the reference potential line SL, while the gate and drain terminals of the NMOS transistors 4 are connected to an associated gate line G. Therefore, the gate lines G and the data lines D are connected to the reference potential line SL through a terminal element of an NMOS transistor. Through the gate lines G and data lines D, a certain voltage generated due to static electricity is input to the NMOS transistors 2 and 4 so as to minimize malfunctions caused by the static electricity.

In the above method, however, if the turn on voltage level is low for the NMOS transistors 2 and 4, currents from the gate and data lines G and D flow therethrough and cause problems for accurately imputing data to the pixels.

SUMMARY OF THE INVENTION

Accordingly, it is an object of the present invention to provide a liquid crystal display panel and a method of operating the same which overcomes the above and other problems encountered in the conventional liquid crystal displays which attempt to eliminate static electricity.

Another object of the present invention is to provide a liquid crystal display panel and a method of operating the same including a plurality of transmission gates each connected to one of a data and gate line for discharging static electricity in the data and gate lines to ground. Another object of the present invention is to provide a method of controlling the operation of the transmission gates connected to the gate and the data lines and a liquid crystal display panel.

These and other objects are achieved by providing An apparatus for controlling at least one transmission line in a liquid crystal display, said liquid crystal display including a plurality of pixels, each pixel including a thin film transistor, at least one thin film transistor connected to said transmission line, said apparatus comprising: at least one transmission gate having first and second gates, an input and an output, said input connected to said transmission line, said transmission gate transmitting when one of a first voltage of said first gate is greater than a voltage of said input and a second voltage of said second gate is less than said voltage of said input; a first external terminal connected to said first gate; a second external terminal connected to said second gate; and a common external terminal connected to said output of said transmission gate.

These and other objects are further achieved by providing a method for controlling at least one transmission line in a liquid crystal display, said liquid crystal display including a plurality of pixels, each pixel including a thin film transistor, at least one thin film transistor connected to said transmission line, said method comprising: providing at least one transmission gate having first and second gates, an input and an output, said input connected to said transmission line, said transmission gate transmitting when one of a first voltage of said first gate is greater than a voltage of said input and a second voltage of said second gate is less than said voltage of said input; first applying a first voltage to said first gate; second applying a second voltage to said second gate; and third applying a third voltage to said output.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 3:
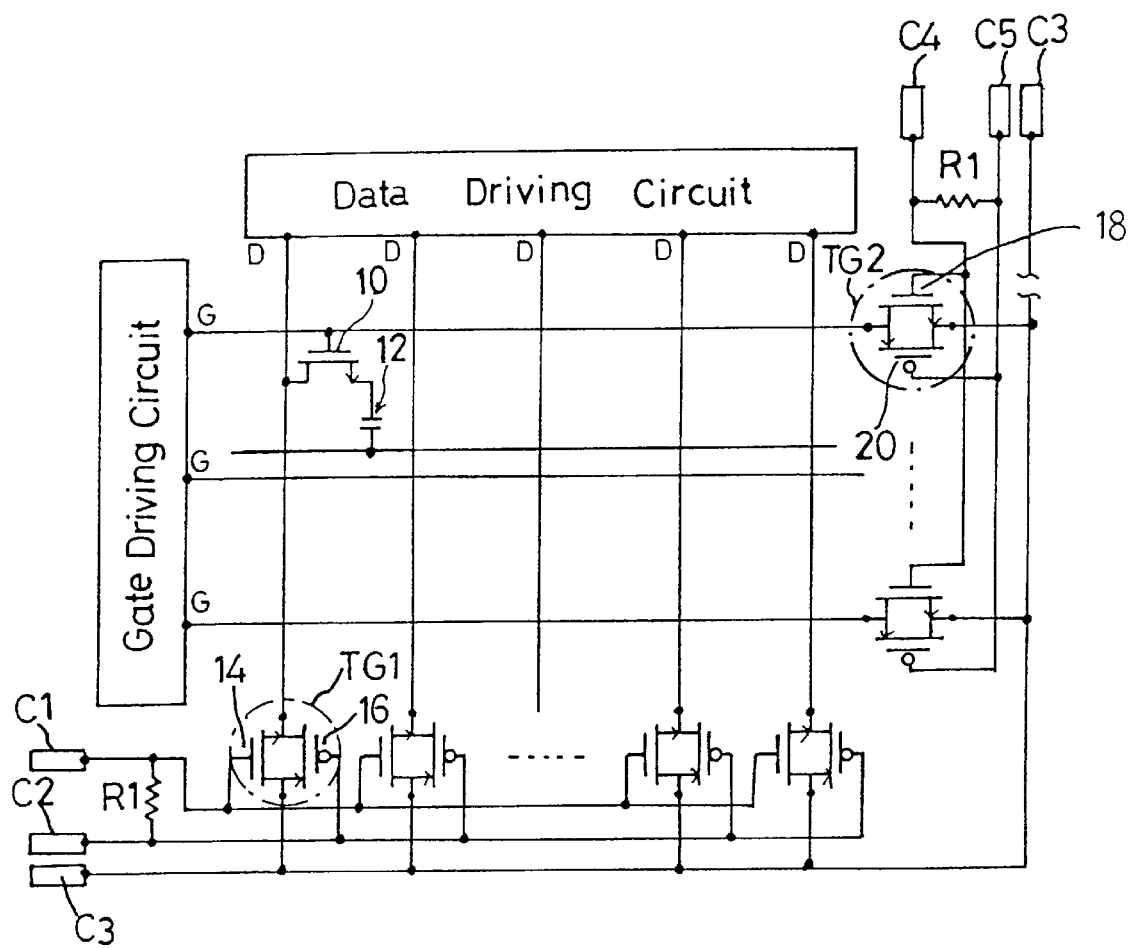
FIG. 3 shows a view of a liquid crystal display panel which eliminates static electricity in accordance with an embodiment of the present invention.

Referring now in detail to the drawings for the purpose of illustrating the preferred embodiments of the present invention, the liquid crystal display panel as shown in FIG. 3 includes a plurality of data lines D and a plurality of gate lines G crossing each other to form a matrix type pixel array. Each pixel includes a thin film transistor 10 connected to the corresponding data line D and gate line G, and a pixel electrode 12 connected to the drain electrode of the thin film transistor (TFT) 10.

The liquid crystal display panel further includes a plurality of first and second CMOS transmission gates TG1 and TG2, each connected to a first or open end portion of a data and gate line D and G, respectively. Also, the second end portion of each gate and data line G and D is connected to a gate driving circuit and a data driving circuit, respectively. The first transmission gates TG1 are each formed by connecting a first NMOS transistor 14 and a first PMOS transistor 16. The gates of the first NMOS transistors 14 are commonly connected to a first external control terminal C1. The gate terminals of the first PMOS transistors 16 are commonly connected to a second external control terminal C2.

The second transmission gates TG2 are each formed by connecting a second NMOS transistor 18 and a second PMOS transistor 20. The gate terminals of the second NMOS transistors 18 are commonly connected to a fourth external control terminal C4. Similarly, the gate terminals of the second PMOS transistors 20 are commonly connected to a fifth external control terminal C5.

The outputs of the first and second transmission gates TG1 and TG2 are commonly connected to a third external control terminal C3. Between the first and the second external control terminals C1 and C2 and between the fourth and fifth external control terminals C4 and C5, a resistor R1 having a certain resistance value is connected. If the resistance value of the resistor R1 is too large, it may minimize the effectiveness of the static electricity prevention technique according to the present invention. Therefore, it is preferable to consider the power consumption of the completed panel during operation, and use an appropriate resistance value for the resistor R1. The resistance of resistor R1 should be between 1 KΩ and 100 MΩ, preferably between 10 KΩ and 100 KΩ, and more preferably 50 KΩ.

The operation of the liquid crystal display panel having the above-described static electricity prevention mechanism is as follows.

As discussed above, the first and second transmission gates TG1 and TG2 respectively include first and second NMOS transistors 14 or 18 and first and second PMOS transistors 16 or 20. An operation channel is formed for each of the first and second transmission gates TG1 and TG2 depending on the potential difference Vgs between the source and gate terminals, respectively, of the first and second NMOS and PMOS transistors 14, 18, 16 and 20.

Figure 4:
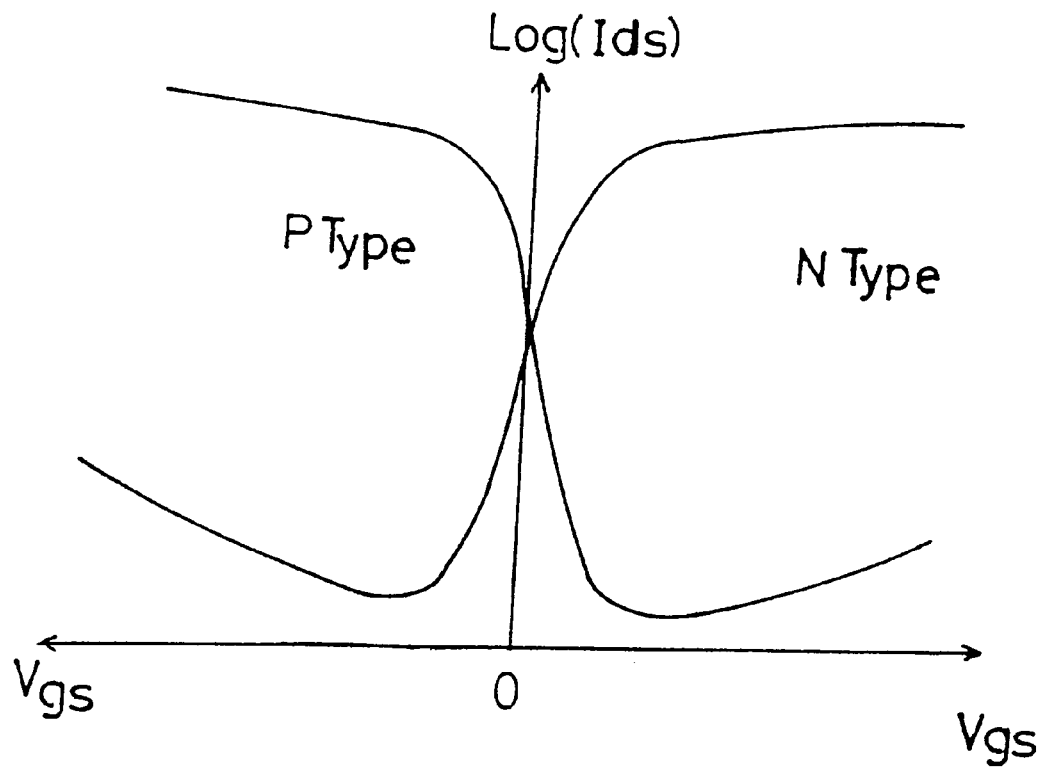
FIG. 4. shows a graph for explaining operational characteristics of a transmission gate used in the liquid crystal display panel of the present invention.

FIG. 4 shows the operation characteristics of the first and second NMOS transistors 14 and 18 and the first and second PMOS transistors 16 and 20 with respect to Vgs. As shown in FIG. 4, the first and second NMOS transistors 14 and 18 are turned on when Vgs is positive, whereas the first and second PMOS transistors 16 and 20 are turned on when Vgs is negative.

Using the above characteristics of the first and second transmission gates TG1 and TG2, during the manufacturing process a common potential is maintained between the first external terminal C1 and the second external control terminal C2 and between the fourth external control terminal C4 and the fifth external control terminal C5. That is, since the input terminal of each of the first and second transmission gates TG1 and TG2 is in a floating condition, the resistors R1 respectively connected to the two gate terminals of each of the transmission gates TG1 and TG2 prevent a voltage drop from occurring.

Therefore, at least one of the first NMOS and PMOS transistors 14 and 16 in each of the first transmission gates TG1 and at least one of the second NMOS and PMOS transistors 18 and 20 in each of the second transmission gates TG2 are in a conductive state. Using the first transmission gates TG1 connected to the data lines D as an example, the operation of the first and second transmission gates TG1 and TG2 will be descried in greater detail. If the electric potential of a data line D were to increase due to static electricity the terminal of the first PMOS transistor 16 connected to the data line functions as a source. This results in a negative (−) Vgs in the first PMOS transistor 16. The negative Vgs turns on the first PMOS transistor 16 of the transmission gate TG1 which allows the static electricity from the data line D to be discharged. On the other hand, if the electric potential of the data line D falls due to static electricity, the first NMOS transistor 14 of the first transmission gate TG1 is turned on to discharge the static electricity therefrom. Since the second transmission gates TG2 operate in the same manner with respect to the gate lines G, that description will not be repeated for the sake of brevity.

If static electricity is generated in a data or gate line D or G, the respective first or second transmission gate TG1 or TG2 connected thereto is turned on to transmit the static electricity to the third external control terminal C3. By connecting the third external control terminal C3 to ground, any static electricity output from or through the first and second transmission gates TG1 and TG2 is discharged to ground through the third external control terminal C3.

However, even if the third external control terminal C3 were floating, damage from static electricity can be prevented since the data lines D and the gate lines G would have a common potential.

In addition to discharging static electricity generated during the manufacturing process, the device as shown in FIG. 3 is used to test the gate driving circuit or the data driving circuit.

In testing either the gate driving circuit or the data driving circuit, a low level signal is applied to the first external control terminal Cl and a high level signal is applied to the second external control terminal C2. The transmission gates TG1 connected to the data lines D are turned off. As a result, the data lines D are isolated and become available for testing. Similarly, by applying a low level signal to the fourth external control terminal C4 and applying a high level signal to the fifth external control terminal C5, the second transmission gates TG2 are turned off. As a result, the gate lines G are isolated and become available for testing.

Figure 1:
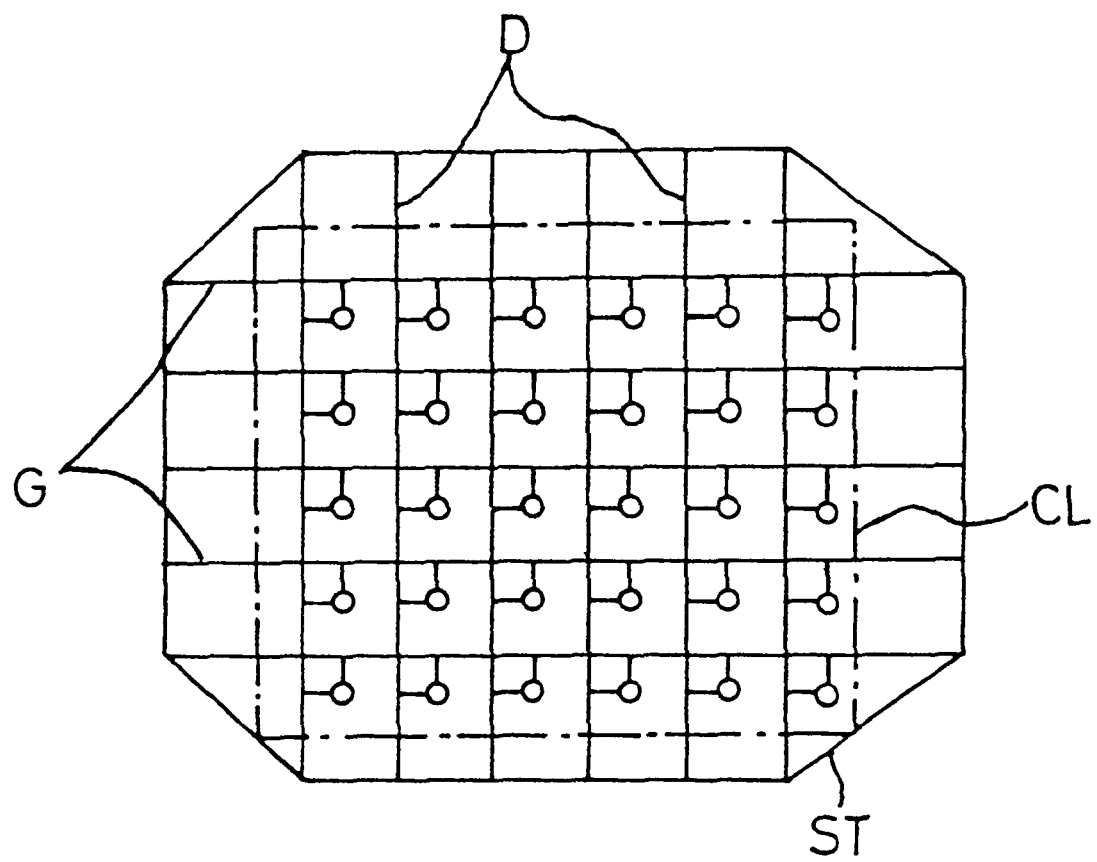
FIG. 1 shows a perspective view of a liquid crystal display panel for explaining a conventional method of preventing static electricity in a liquid crystal display.
Figure 2:
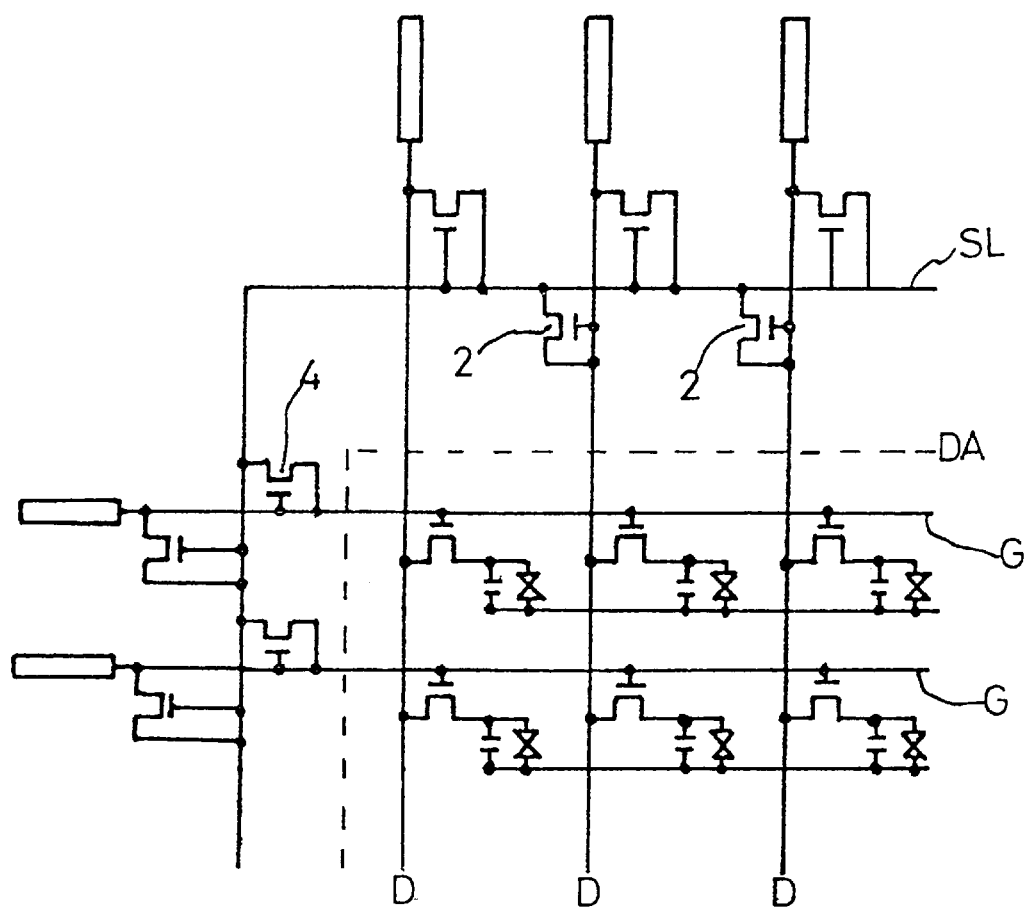
FIG. 2 shows a schematic view of a circuit of a liquid crystal display panel for illustrating another conventional method of preventing static electricity in a liquid crystal display.

Accordingly, the present invention overcomes the technical limitations of the conventional static prevention technique as shown in FIG. 1, and allows testing of driving circuits.

If the device incorporating the liquid crystal display is in a completed state, the present invention can be used to pre-charge the pixels. Generally, when driven, a pixel is alternatively charged to a positive polarity data value +Vd and a negative polarity data value −Vd. To pre-charge a pixel, a pre-charge voltage is applied to the third external control terminal C3. The pre-charge voltage is greater than Vd when Vd will be applied to the pixel, and is less than −Vd when −Vd will be applied to the pixel. Also, a high level signal is applied to the first external control terminal Cl and a low level signal is applied to the second external control terminal C2. In this case, the electric potential applied to the third external terminal C3 is established at the output terminal of the first transmission gates TG1, and is, thus, established at each of the data lines D.

However, since a high level electric potential should not be established at each of the gate lines G, the gate lines G are maintained in the isolated state. As described above, the isolated state is established by applying a low level signal to the fourth external control terminal C4 and applying a high level signal to the fifth external control terminal C5.

The pre-charge operation described above involves applying a pre-charge signal to the data lines D after the gate driving signal is applied to the gate lines G, but before data signals are applied to the data lines D, so as to pre-charge the pixel electrodes. As a result, the charge time for the pixels is reduced.

In the transmission gates, the terminal to which the pre-charge voltage is applied is the source terminal of the PMOS transistor. Thus, the output terminal connected to the third external control terminal C3 of the first and second transmission gates TG1 and TG2 functions as a voltage input terminal. According to the signal applied to the first and second external terminals C1 and C2, the first transmission gates TG1 are turned on. Since the transmission gates TG1 function as bi-directional transmission gates, when the transmission gates TG1 are turned on and a pre-charge voltage is applied to the third external C3, the pre-charge voltage is transmitted to the data lines D for pre-charging the pixel electrodes connected to the data lines D.

In addition to allowing discharging of static electricity generated during the manufacturing process of a liquid crystal display, once the product is completed, the present invention provides a pre-charge function as described above.

Figure 5:
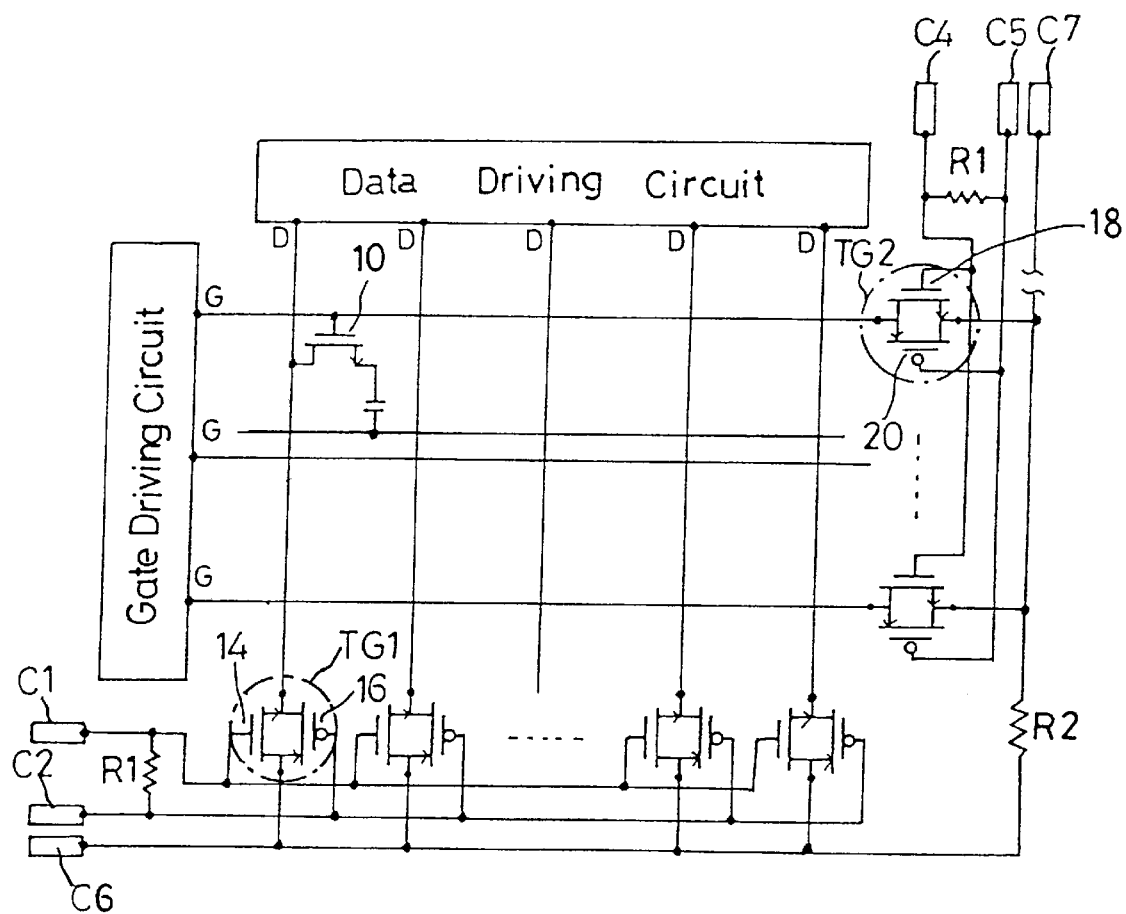
FIG. 5 shows a view of a liquid crystal display panel which eliminates static electricity in accordance with another embodiment of the present invention.

FIG. 5 illustrates another embodiment of a liquid crystal display panel which eliminates static electricity according to the present invention. FIG. 5 is substantially the same as FIG. 3 except that the third external terminal C3 has been replaced by a sixth external terminal C6 and seventh external terminal C7 connected via a second resistor R2. The first transmission gates TG1 have their outputs connected to the sixth external terminal C6, while the second transmission gates TG2 have their outputs connected to the seventh external terminal C7.

Because the voltage necessary to turn on the TFTs 10 can differ from the desired voltage to be applied to the pixels via the first transmission gates TG1, the addition of resistor R2, allows for different voltages to be applied to the sixth and seventh external terminals C6 and C7. Accordingly, the resistance of the second resistor R2 should be chosen such that a proper voltage drop is achieved across the second resistor R2 to allow for the different voltages at the seventh external terminal C7 and the sixth external terminal C6. For example, a 100 KΩ resistance is proper when 20 volts is applied to the seventh terminal C7 and 5 volts is applied to the sixth terminal C6.

Figure 6:
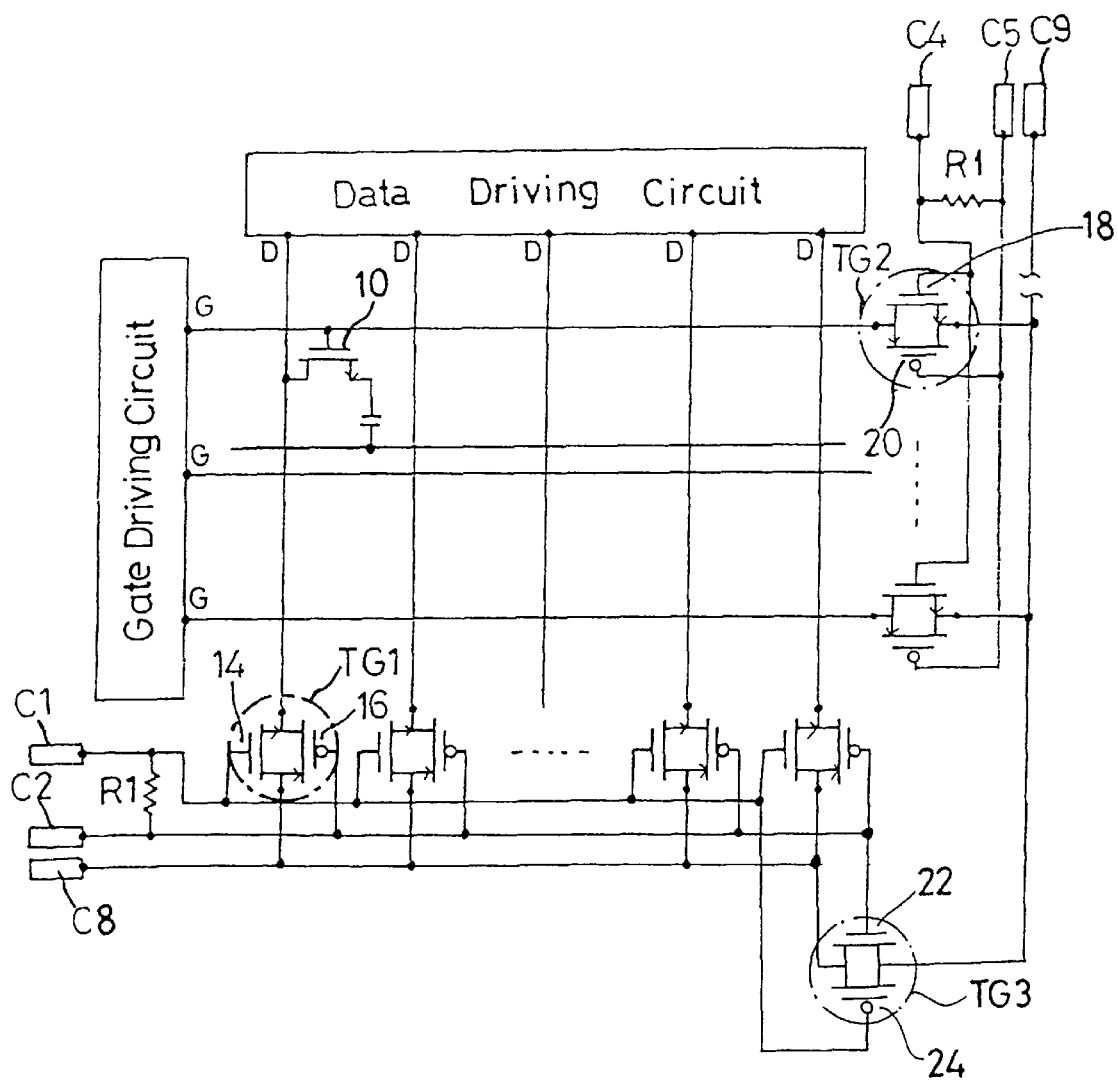
FIG. 6 shows a view of a liquid crystal display panel which eliminates static electricity in accordance with another embodiment of the present invention.

FIG. 6 illustrates another embodiment of the liquid crystal display panel which eliminates static electricity in accordance with the present invention. FIG. 6 is substantially the same as FIG. 3, except that the third external terminal C3 has been replaced by an eighth external terminal C8 and a ninth external terminal C9 connected to one another via a third transmission gate TG3. The third transmission gate TG3 includes a third NMOS transistor 22 and a third PMOS transistor 24 connected to one another. The gate of the third NMOS transistor 22 is connected to the second external terminal C2, while the gate of the third PMOS transistor 24 is connected to the first external terminal C1.

During operation, the third transmission gate TG3 conducts when the first and second external terminals C1 and C2 are in the floating state such that the data and gate lines are at the same potential. During isolation of the data driving circuit, the third transmission gate TG3 is turned on connecting the eighth external terminal C8 and the ninth external terminal C9. During the pre-charge operation, however, the third transmission gate TG3 is turned off; thus, allowing for different potentials to be applied to the eighth external terminal C8 and the ninth external terminal C9.

In the embodiments of the present invention, the resistor R1, connected between the first and second external control terminals C1 and C2 and between the fourth and fifth external control terminals C4 and C5, is fixed in the panel. However, such an arrangement is only an example of the present invention and one of ordinary skill in the art would be able to suggest variations as well as practical applications of the present invention.

For instance, a resistance value of between 1 KΩ to 100 MΩ for the resistor R1 may be utilized to reduce power consumption during operation of the completed product. Alternatively, the resistor R1 can be eliminated upon completion of the manufacturing process and/or testing. Also, static electricity may be eliminated during or upon completion of the manufacturing process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for controlling at least one transmission line in a liquid crystal display, said liquid crystal display including a plurality of pixels, each pixel including a thin film transistor, at least one thin film transistor connected to said transmission line, said apparatus comprising:

at least one transmission gate having first and second gates, an input and an output, said input connected to said transmission line, said transmission gate transmitting when one of a first voltage of said first gate is greater than a voltage of said input and a second voltage of said second gate is less than said voltage of said input;

a first external terminal connected to said first gate;

a second external terminal connected to said second gate; and a common external terminal connected to said output of said transmission gate.

2. The apparatus of claim 1, wherein said first and second external terminals are in a floating condition.

3. The apparatus of claim 2, wherein said common external terminal applies a ground voltage.

4. The apparatus of claim 1, wherein
   said first external terminal applies said first voltage such that said first voltage is less than said voltage of said input; and
   said second external terminal applies said second voltage such that said second voltage is less than said voltage of said input.

5. The apparatus of claim 1, wherein
   said first external terminal applies said first voltage such that said first voltage is greater than said voltage of said input;
   said second external terminal applies said second voltage such that said second voltage is greater than said voltage of said input; and
   said common external terminal applies a predetermined voltage.

6. The apparatus of claim 1, further comprising:
   a resistor electrically connected between said first external terminal and said second external terminal.

7. The apparatus of claim 6, wherein said resistor has a resistance between 1 KΩ and 100 MΩ.

8. The apparatus of claim 1, wherein said transmission line is a data line in said liquid crystal display and is connected to a drain electrode of at least one thin film transistor.

9. The apparatus of claim 1, wherein said transmission line is a gate line in said liquid crystal display and is connected to a gate electrode of at least one thin film transistor.

10. The apparatus of claim 1, wherein a plurality of transmission lines are included in said liquid crystal display, and further comprising:
    a plurality of transmission gates, each transmission gate being connected to a respective one of said plurality of transmission line.

11. The apparatus of claim 1, wherein
    the first external terminal is controllable independently of said input; and
    the second external terminal is controllable independently of said input.

12. An apparatus for controlling gate and data lines in a liquid crystal display, said gate and data lines crossing each other to form an array of pixels, each pixel including at least one thin film transistor, each thin film transistor having a drain connected one of said data lines and a gate connected to one of said gate lines, said apparatus comprising:

a plurality of first transmission gates, each first transmission gate having a first and second gate, a first input and a first output, said first input of each first transmission gate connected to an associated one of said data lines, each first transmission gate transmitting when one of a first voltage of said first gate is greater than a voltage of said first input and a second voltage of said second gate is less than said voltage of said first input;

a plurality of second transmission gates, each second transmission gate having a third and fourth gate, a second input and a second output, said second input of each second transmission gate connected to an associated one of said gate lines, each second transmission gate transmitting when one of a third voltage of said third gate is greater than a voltage of said second input and a fourth voltage of said fourth gate is less than said voltage of said second input;

a first external terminal connected to said first gate;

a second external terminal connected to said second gate;

a third external terminal connected to said third gate; and a fourth external terminal connected to said fourth gate.

13. The apparatus of claim 12, further comprising:
    a first resistor electrically connected between said first and second external terminals; and
    a second resistor electrically connected between said third and fourth external terminals.

14. An apparatus of claim 12, further comprising:
    a common external terminal connected to said first and second outputs.

15. The apparatus of claim 12, further comprising:
    a first common external terminal connected to said first outputs;
    a second common external terminal connected to said second outputs; and
    a resistor having first and second ends, said first end connected to said first common external terminal and said second end connected to said second common external terminal.

16. The apparatus of claim 12, further comprising:
    a first common external terminal connected to said first outputs;
    a second common external terminal connected to said second outputs; and
    a third transmission gate having a fifth and sixth gate, a third input and a third output, said fifth gate connected to said first external terminal, said sixth gate connected to said second external terminal, said third input connected to said first common external terminal, and said third output connected to said second common external terminal.

17. The apparatus of claim 16, wherein said third transmission gate includes an NMOS transistor and a PMOS transistor, said fifth gate is a gate of said PMOS transistor, and said sixth gate is a gate of said NMOS transistor.

18. The apparatus of claim 12, wherein
    the first external terminal is controllable independently of said first input; and
    the second external terminal is controllable independently of said first input.

19. The apparatus of claim 12, wherein the third external terminal is controllable independently of said second input; and the fourth terminal is controllable independently of said second input.

20. The apparatus of claim 12, wherein the first external terminal is controllable independently of said first input;

the second external terminal is controllable independently of said first input;

the third external terminal is controllable independently of said second input; and the fourth terminal is controllable independently of said second input.

21. A method for controlling at least one transmission line in a liquid crystal display, said liquid crystal display including a plurality of pixels, each pixel including a thin film transistor, at least one thin film transistor connected to said transmission line, said method comprising:

providing at least one transmission gate having first and second gates, an input and an output, said input connected to said transmission line, said transmission gate transmitting when one of a first voltage of said first gate is greater than a voltage of said input and a second voltage of said second gate is less than said voltage of said input;

first applying a first voltage to said first gate second applying a second voltage to said second gate; and third applying a third voltage to said output.

22. The method of claim 21, wherein said first and second applying steps apply a floating voltage.

23. The method of claim 22, wherein said third applying step applies a ground voltage.

24. The method of claim 21, wherein said first applying step applies said first voltage such that said first voltage is less than said voltage of said input; and said second applying step applies said second voltage such that said second voltage is greater than said voltage of said input.

25. The method of claim 21, wherein said first applying step applies said first voltage such that said first voltage is greater than said voltage of said input;

said second applying step applies said second voltage such that second voltage is less than said voltage of said input; and said third applying step applies a predetermined high voltage as said third voltage.

26. The method of claim 21, further comprising:

providing a resistor electrically connected between said first and second gates.

27. The method of claim 26, wherein said resistor has a resistance between 1 KΩ and 100 MΩ.

28. The method of claim 21, wherein said transmission line is a data line in said liquid crystal display and is connected to a drain electrode of at least one thin film transistor.

29. The method of claim 21, wherein said transmission line is a gate line in said liquid crystal display and is connected to a gate electrode of at least one thin film transistor.

30. The method of claim 21, wherein a plurality of transmission lines are included in said liquid crystal display, and wherein said providing step provides a plurality of transmission gates, each transmission gate being connected to a respective one of said plurality of transmission lines.

31. The method of claim 21, wherein said first applying step applies said first voltage independently of said voltage of said input; and said second applying step applies said second voltage independently of said voltage of said input.

32. A method for controlling gate and data lines in a liquid crystal display, said gate and data lines crossing each other to form an array of pixels, each pixel including at least one thin film transistor, each thin film transistor having a drain connected one of said data lines and a gate connected to one of said gate lines, said method comprising:

providing a plurality of first transmission gates, each first transmission gate having a first and second gate, a first input and a first output, said first input of each first transmission gate connected to an associated one of said data lines, each first transmission gate transmitting when one of a first voltage of said first gate is greater than a voltage of said first input and a second voltage of said second gate is less than said voltage of said first input;

providing a plurality of second transmission gates, each second transmission gate having a third and fourth gate, a second input and a second output, said second input of each second transmission gate connected to an associated one of said gate lines, each second transmission gate transmitting when one of a third voltage of said third gate is greater than a voltage of said second input and a fourth voltage of said fourth gate is less than said voltage of said second input;

first applying a first voltage to said first gate;

second applying a second voltage to said second gate;

third applying a third voltage to said third gate; and fourth applying a fourth voltage to said fourth gate.

33. The method of claim 32, further comprising:

providing a first resistor electrically connected between said first and second gates; and providing a second resistor electrically connected between said third and fourth gates.

34. The method of claim 32, further comprising:

fifth applying a fifth voltage to said first and second outputs.

35. The method of claim 32, further comprising:

connecting said first and second outputs with a resistor;

fifth applying a fifth voltage to said first outputs; and sixth applying a sixth voltage to said second outputs.

36. The method of claim 32, further comprising:

connecting said first and second outputs with a third transmission gate, said third transmission gate having a fifth and sixth gate, a third input and a third output, said connecting step including the sub-steps of, connecting said fifth gate to said first external terminal, connecting said sixth gate to said second external terminal, connecting said third input to said first outputs, and connecting said third output to said second outputs.

37. The method of claim 36, wherein said third transmission gate includes an NMOS transistor and a PMOS transistor, said fifth gate is a gate of said PMOS transistor, and said sixth gate is a gate of said NMOS transistor.

38. The method of claim 32, wherein said first applying step applies said first voltage independently of said voltage of said first input; and said second applying step applies said second voltage independently of said voltage of said first input.

39. The method of claim 32, wherein said third applying step applies said third voltage independently of said voltage of said second input; and said fourth applying step applies said fourth voltage independently of said voltage of said second input.

40. The method of claim 32, wherein said first applying step applies said first voltage independently of said voltage of said first input;

said second applying step applies said second voltage independently of said voltage of said first input;

said third applying step applies said third voltage independently of said voltage of said second input; and said fourth applying step applies said fourth voltage independently of said voltage of said second input.

\* \* \* \* \*